United States Patent
Taylor et al.

(10) Patent No.: US 12,136,049 B2
(45) Date of Patent: *Nov. 5, 2024

(54) SYSTEMS AND METHODS FOR MANAGING MEETING SPACES

(71) Applicant: Walmart Apollo, LLC, Bentonville, AR (US)

(72) Inventors: Robert J. Taylor, Rogers, AR (US); Remington R. Rice, Bentonville, AR (US); Gerald C. Murphy, Rogers, AR (US); Nicholas Paul Dowd, Rogers, AR (US); Carlos R. Alvarez, Rogers, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/219,898

(22) Filed: Jul. 10, 2023

(65) Prior Publication Data

US 2023/0351273 A1 Nov. 2, 2023

Related U.S. Application Data

(63) Continuation of application No. 16/930,025, filed on Jul. 15, 2020, now Pat. No. 11,741,399.

(Continued)

(51) Int. Cl.
*G06Q 10/02* (2012.01)
*H04W 4/02* (2018.01)
*H04W 4/38* (2018.01)

(52) U.S. Cl.
CPC .......... *G06Q 10/02* (2013.01); *H04W 4/023* (2013.01); *H04W 4/38* (2018.02)

(58) Field of Classification Search
CPC ......... G06Q 10/02; H04W 4/38; H04W 4/023
(Continued)

(56) References Cited

U.S. PATENT DOCUMENTS 8,743,171 B2 6/2014 Hiller
9,760,870 B2 9/2017 Norton
(Continued)

OTHER PUBLICATIONS

"Smart Meeting Room Usage Information and Prediction by Modelling Occupancy Profiles" Published by MDPI (Year: 2019).*
(Continued)

*Primary Examiner* — Zeina Elchanti
(74) *Attorney, Agent, or Firm* — Fitch, Even, Tabin & Flannery, LLP

(57) ABSTRACT

In some embodiments, apparatuses and methods are provided herein useful to reassigning meeting rooms. In some embodiments, a system comprises a mobile device configured to receive user input to request a meeting room, determine a location of the mobile device, and transmit an indication of the request, the location of the mobile device, and the user, sensors associated with the meeting rooms configured to detect occupancy of the meeting rooms, a scheduling database configured to store scheduling information for the meeting rooms, the control circuit configured to receive the indication of the request, the location of the mobile device, and the user, determine that all meeting are booked, receive occupancy information for the meeting rooms, determine that one of the meeting rooms is unoccupied, reassign the one of the meeting rooms to the user, and cause transmission of a notification that the one of the meeting rooms has been reassigned.

20 Claims, 3 Drawing Sheets

Related U.S. Application Data

(60) Provisional application No. 62/874,186, filed on Jul. 15, 2019.

(58) Field of Classification Search
USPC .................................................. 705/5
See application file for complete search history.

(56) References Cited

U.S. PATENT DOCUMENTS

| | | | |
|---|---|---|---|
| 10,405,146 B1* | 9/2019 | Kuruvilla | H04W 4/38 |
| 10,824,997 B2* | 11/2020 | Hill | G06Q 10/02 |
| 11,741,399 B2 | 8/2023 | Taylor | |
| 2004/0267623 A1 | 12/2004 | Vivadelli | |
| 2015/0006218 A1 | 1/2015 | Klemm | |
| 2020/0219066 A1* | 7/2020 | Lin | G06Q 10/1095 |
| 2020/0311619 A1* | 10/2020 | Ramirez Flores | G06Q 10/02 |
| 2021/0264376 A1* | 8/2021 | Kilicoglu | G06F 40/279 |

OTHER PUBLICATIONS

Evoko; "Evoko Room Scheduler New Zealand"; https://www.gend.co/evoko-new-zealand; Feb. 27, 2019; pp. 1-11.

Office 365; "Configure Resource Scheduling Options/Settings/Permissions"; https://kb.wisc.edu/office365/page.php?id=40547; Feb. 27, 2019; pp. 1-4.

Robin; "Conference Room Schedule Display"; https://robinpowered.com/features/room-display/; Feb. 27, 2019; pp. 1-6.

Teem; "Teem Room Display"; https://www.teem.com/room-scheduling-software; Feb. 27, 2019; pp. 1-16.

USPTO; U.S. Appl. No. 16/930,025; Final Rejection mailed Dec. 1, 2022; (pp. 1-18).

USPTO; U.S. Appl. No. 16/930,025; Non-Final Rejection mailed Jul. 1, 2022; (pp. 1-15).

USPTO; U.S. Appl. No. 16/930,025; Notice of Allowance and Fees Due (PTOL-85) mailed Apr. 14, 2023; (pp. 1-9).

* cited by examiner

SYSTEMS AND METHODS FOR MANAGING MEETING SPACES

CROSS-REFERENCE TO RELATED APPLICATION

This application is a continuation of U.S. patent application Ser. No. 16/930,025, filed Jul. 15, 2020, now U.S. Pat. No. 11,741,399, which claims the benefit of U.S. Provisional Application No. 62/874,186, filed Jul. 15, 2019, which are all incorporated by reference in their entirety herein.

TECHNICAL FIELD

This invention relates generally to organizational systems and, more particularly, to organizational systems for meeting rooms.

BACKGROUND

Many systems exist that seek to aid users in scheduling meetings. One such feature of these systems is the ability to book a meeting space (e.g., a meeting room) for use for the meeting. When a meeting is scheduled in a meeting room, that meeting room will be reserved for the specific meeting. Such scheduling allows users to book and reserve rooms. However, meetings are often changed, modified, canceled, missed, etc. When this happens, the meeting room may not be utilized. However, because the meeting room is still booked, others may not be able to schedule a meeting in the meeting room. This can result in underutilization of space. Consequently, a need exists for better systems, methods, and apparatuses to manage meeting spaces.

BRIEF DESCRIPTION OF THE DRAWINGS

Disclosed herein are embodiments of systems, apparatuses and methods pertaining to reassigning meeting rooms. This description includes drawings, wherein.

Figure 1:
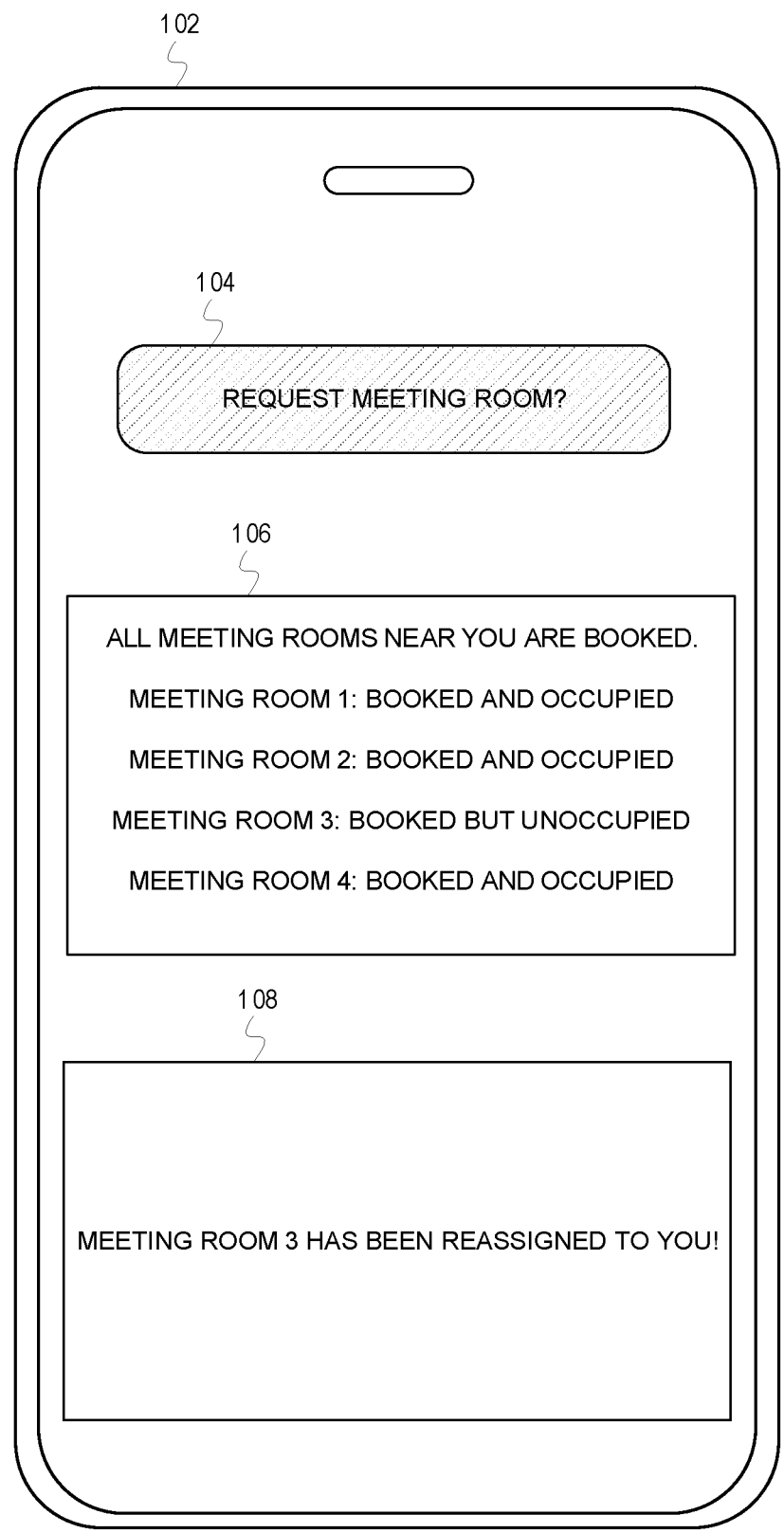
FIG. 1 depicts a mobile device 102 presenting a meeting room request dialogue 104, according to some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein useful to reassigning meeting rooms. In some embodiments, a system for reassigning meeting rooms comprises a mobile device, wherein the mobile device is carried by a user, wherein the mobile device is configured to receive user input to request a meeting room, determine a location of the mobile device, and transmit, to a control circuit, an indication of the request, the location of the mobile device, and the user, a plurality of sensors, wherein ones of the plurality of sensors are associated with the meeting rooms, wherein the ones of the plurality of sensors are configured to detect occupancy of the meeting rooms with which they are associated, a scheduling database, wherein the scheduling database is configured to store scheduling information for the meeting rooms, and the control circuit, wherein the control circuit is communicatively coupled to the mobile device, the plurality of sensors, and the scheduling database, wherein the control circuit is configured to receive, from the mobile device, the indication of the request, the location of the mobile device, and the user, determine, based on accessing the scheduling database and the indication of the location of the mobile device, that all meeting rooms within a threshold distance from the location of the mobile device are booked, receive, from the plurality of sensors, occupancy information for the meeting rooms, determine, based on the occupancy information for the meeting rooms, that one of the meeting rooms is unoccupied, reassign, in the scheduling database, the one of the meeting rooms to the user, and cause transmission of a notification to the mobile device that the one of the meeting rooms has been reassigned to the user.

As previously discussed, many systems exist that seek to aid users in scheduling meetings. While these systems can make arranging meetings easy for users, they can result in inefficiencies. For example, if a meeting is scheduled for a meeting room but is subsequently canceled, the meeting room may be left unused. That is, if the people attending the meeting decide that the meeting is not necessary (i.e., cancel the meeting) but don't cancel the meeting via the system, the meeting room will still be booked even though it is not actually going to be used. Because the meeting room is booked but ends up being unoccupied during that time slot, the meeting room may be underutilized. For example, another user may wish to host a meeting but since the meeting room is booked, he or she cannot use the meeting room to do so. The systems, methods, and apparatuses disclosed herein seek to overcome this problem.

In one embodiment, a system is presented that includes a scheduling database and sensors. The sensors are associated with meeting rooms and are configured to detect occupancy of the meeting rooms. If a user wishes to book a meeting room but all meeting rooms are booked, the system evaluates whether the meeting rooms are occupied. If a meeting room is booked but unoccupied, the system can reassign the meeting room to the user. The discussion of FIG. 1 provides an overview of such a system.

FIG. 1 depicts a mobile device 102 presenting a meeting room request dialogue 104, according to some embodiments. Though depicted in FIG. 1 as a smartphone, the mobile device 102 can be of any suitable type (e.g., smartphone, tablet, laptop or desktop computer, automotive infotainment system, etc.). The user can request a meeting room via the mobile device 102. For example, the user can request a meeting room via an application executing on the mobile device 102 and/or via a web browser executing on the mobile device 102. In either case, the mobile device 102 presents the meeting room request dialogue 104. The user selects the meeting room request dialogue 104 to request the meeting room.

Once the user requests the meeting room, the system attempts to find a meeting room for the user. Meeting room usage and booking is stored in a scheduling database. The system references the scheduling database to determine if there are any meeting rooms that are available for the user. In some embodiments, the user can specify criteria for his or her desired meeting room. The criteria can be any suitable characteristic of the meeting room, such as a size of the meeting room or number of attendees for the meeting, capacity of the meeting room, hardware included in the meeting room, conferencing capabilities of the meeting room, divisibility of the meeting room, location of the meeting room, etc. Additionally, in some embodiments, when the user requests the meeting room, the location of the user (e.g., the user's mobile device 102) is used to find a meeting room near the user.

In some embodiments, the mobile device 102 presents a list 106 of meeting rooms. The list 106 of meeting rooms can include, for example, those meeting rooms within a threshold distance of the user, that are not occupied, that are or are not booked, that will be available soon, etc. As depicted in FIG. 1, the list 106 includes four meeting rooms that are near the user: Meeting Room 1, Meeting Room 2, Meeting Room 3, and Meeting Room 4. All four meeting rooms are booked, though Meeting Room 3 is unoccupied. Because Meeting Room 3 is unoccupied, the system reassigns Meeting Room 3 to the user. The mobile device 102 presents a notification 10 to the user indicating that Meeting Room 3 has been reassigned to the user.

Figure 2:
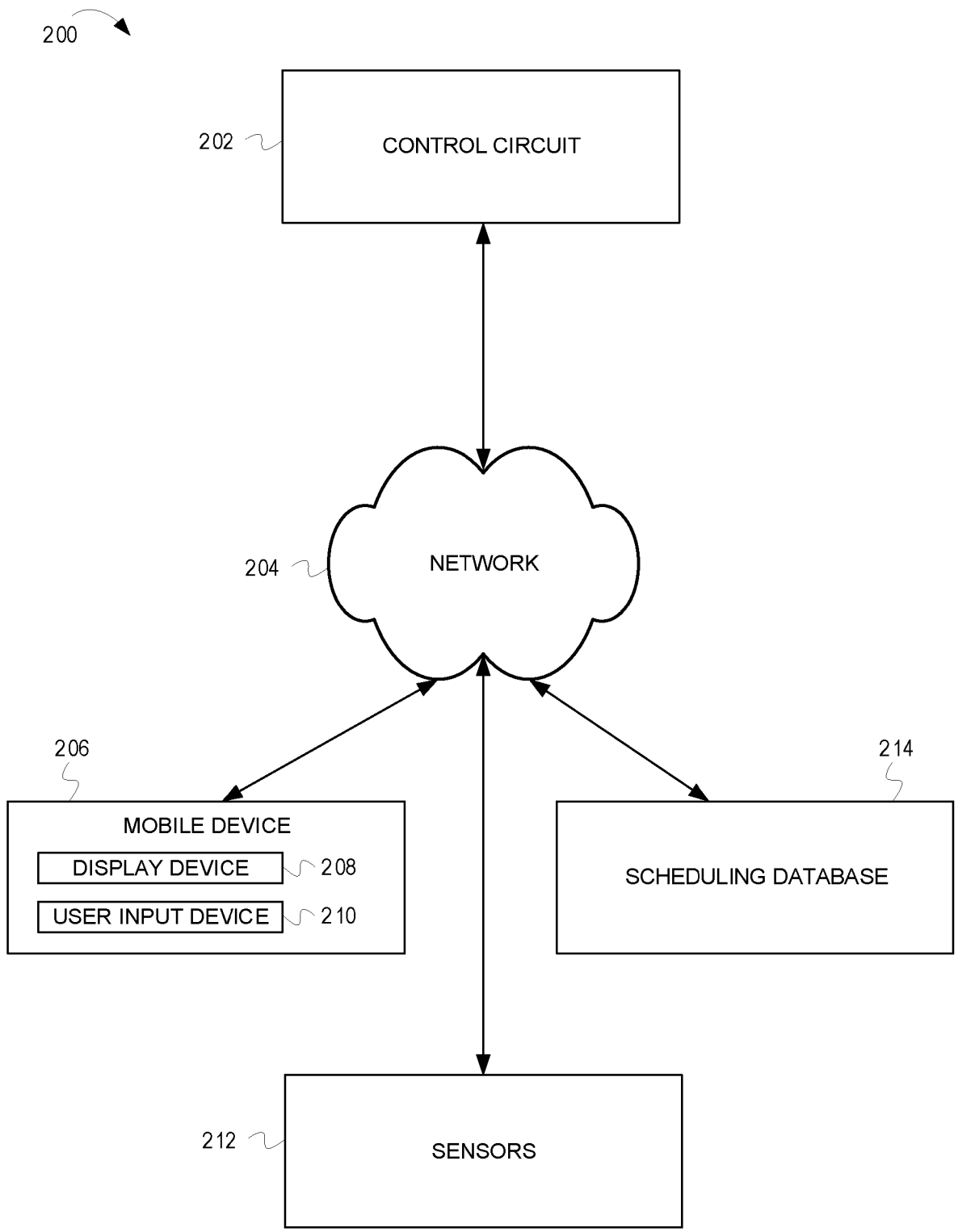
FIG. 2 is a block diagram of a system 200 for reassigning meeting rooms, according to some embodiments.

While the discussion of FIG. 1 provides background information regarding reassigning meeting rooms, the discussion of FIG. 2 provides additional detail regarding a system for reassigning meeting rooms.

FIG. 2 is a block diagram of a system 200 for reassigning meeting rooms, according to some embodiments. The system 200 includes a control circuit 202, a mobile device 206, sensors 212, and a scheduling database 214. One or more of the control circuit 202, mobile device 206, sensors 212, and scheduling database 214 are communicatively coupled via a network 204. Accordingly, the network 204 can be of any suitable type and include wired and/or wireless links. For example, that network 204 can include a local area network LAN and/or a wide area network (WAN), such as the Internet.

The scheduling database 214 includes scheduling information for meeting rooms. For example, the scheduling database 214 can include meeting rooms and the availability of the meeting rooms. When a meeting room is booked, the scheduling database includes an indication of the meeting room and a time slot in which the meeting room is booked. Additionally, in some embodiments, the scheduling database 214 includes an indication of a user that has scheduled the meeting (i.e., a meeting originator) as well as the attendees of the meeting. In some embodiments, the scheduling database 214 stores information about the meeting rooms, such as characteristics of the meeting rooms (e.g., a size of the meeting room or number of attendees for the meeting, capacity of the meeting room, hardware included in the meeting room, conferencing capabilities of the meeting room, divisibility of the meeting room, location of the meeting room, etc.).

The sensors 212 are associated with the meeting rooms. The sensors 212 are configured to detect occupancy of the meeting rooms with which they are associated. Accordingly, the sensors 212 can include motion sensors, audio sensors, device usage sensors, smart panels, locationing sensors, temperature sensors, thermal sensors, etc. For example, a meeting room may include a motion sensor that detects movement in the meeting room or people entering the meeting room as well as device usage sensors that detect, for example, if a light has been turned on, a computer has been plugged in, etc. The sensors 212 can be located in the meeting rooms, near the meeting rooms, and/or on devices associated with and/or carried by users.

The mobile device 206 is associated with the user and can be of any suitable type. For example, the mobile device 206 can be a smartphone carried by the user. The mobile device 206 includes a display device 208 and a user input device 210. Though depicted individually in FIG. 2, the display device 208 and the user input device 210 can be a single device, such as a touchscreen. The user can request a meeting room via the mobile device 206. In some embodiments, the user can also view current meeting room usage and scheduling via the mobile device 206. When the user requests a meeting room, and the mobile device 206 transmits an indication of the request to the control circuit 202. In embodiments in which the user can request a meeting room having certain criteria, the mobile device 206 includes the criteria with the indication of the request. Further, in embodiments in which the meeting rooms are selected based on the user's (or mobile device's 206) location, the mobile device 206 transmits an indication of the location to the control circuit 202.

The control circuit 202 can comprise a fixed-purpose hard-wired hardware platform (including but not limited to an application-specific integrated circuit (ASIC) (which is an integrated circuit that is customized by design for a particular use, rather than intended for general-purpose use), a field-programmable gate array (FPGA), and the like) or can comprise a partially or wholly-programmable hardware platform (including but not limited to microcontrollers, microprocessors, and the like). These architectural options for such structures are well known and understood in the art and require no further description here. The control circuit 202 is configured (for example, by using corresponding programming as will be well understood by those skilled in the art) to carry out one or more of the steps, actions, and/or functions described herein.

By one optional approach the control circuit 202 operably couples to a memory. The memory may be integral to the control circuit 202 or can be physically discrete (in whole or in part) from the control circuit 202 as desired. This memory can also be local with respect to the control circuit 202 (where, for example, both share a common circuit board, chassis, power supply, and/or housing) or can be partially or wholly remote with respect to the control circuit 202 (where, for example, the memory is physically located in another facility, metropolitan area, or even country as compared to the control circuit 202).

This memory can serve, for example, to non-transitorily store the computer instructions that, when executed by the control circuit 202, cause the control circuit 202 to behave as described herein. As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as an erasable programmable read-only memory (EPROM).

The control circuit 202 assigns, and reassigns when necessary, meeting rooms. The control circuit 202 receives the indication of the request for the meeting room. The control circuit 202 accesses the scheduling database 214 to determine the availability of the meeting rooms. Additionally, in embodiments in which the user can specify criteria for the meeting room, the control circuit 202 references the scheduling database 214 to determine if a meeting room meeting (e.g., matching a threshold number of criteria, required criteria, all criteria, etc.) the user's criteria is available. In embodiments in which the control circuit 202 receives an indication of a location, the control circuit 202 can search for a meeting room near the location (e.g., within a threshold distance of the location, in the same building as the location, in a building in which a number of the attendees are located, etc.). If a meeting room is available at the time requested by the user, the control circuit 202 assigns the meeting room to the user and updates the scheduling database 214 to reflect the assignment.

If there are no meeting rooms available, the control circuit 202 attempts to reassign a meeting room to the user. The control circuit 202 attempts to reassign meeting rooms based on whether the meeting rooms are occupied. For example, if a meeting room is booked but unoccupied, the control circuit 202 will reassign the unoccupied meeting room. The control circuit 202 reassigns the meeting room to the user in the scheduling database 214. The control circuit 202 can also generate and/or cause a notification to be transmitted to the mobile device 206. The notification alerts the user that the meeting room has been reassigned and provides the user with an indication of the meeting room that has been reassigned. The mobile device 206 presents the notification via the display device 208.

In some embodiments, the control circuit 202 generates and/or causes to be transmitted a notification to other users. For example, the notification can be transmitted to a meeting originator of the meeting for which the meeting room is being reassigned and/or other participants of the original meeting. In some embodiments, the notifications can be presented on display devices present in the meeting room. For example, if the meeting room includes a projector, television, etc., the control circuit 202 can cause presentation of the notification on the display device located in the meeting room. Additionally, in some embodiments, the notification can indicate modifications and/or proposed modifications to meetings and/or future meetings, as described below.

Further, in some embodiments, the control circuit 202 can attempt to manage meetings. For example, if a recurring meeting is frequently canceled or changed, the control circuit 202 can transmit a notification to the meeting originator indicating (e.g., warning) that future occurrences of the recurring meeting will be canceled. For example, if a recurring meeting has been canceled a threshold number of times, the control circuit 202 can cancel subsequent ones of the recurring meeting, transmit a notification to the meeting originator informing the meeting originator that the subsequent meetings will be canceled if a condition is met (e.g., cancelling two or more of the next five meetings), etc. The control circuit can also manage meetings by changing the frequency of the meeting, the duration of the meeting, the time of the meeting, etc. For example, if a recurring meeting is scheduled for once a week but is typically canceled half of the time, the control circuit 202 can propose a change in which the recurring meeting will take place every other week.

As another example, the control circuit can attempt to manage meetings based on the current or historical occupancy of meeting rooms. In such embodiments, the control circuit 202 can determine the occupancy of a meeting room based upon input received from the sensors 212. In one embodiment, the control circuit 202 captures occupancy information for meeting rooms for storage in the scheduling database 214. The control circuit 202 then uses this information in an attempt to "right size" the meeting room for the meeting. For example, if a meeting is scheduled for a large meeting room (e.g., a meeting room that can accommodate 30 people) but there are a small number of attendees (e.g., four attendees), the control circuit 202 can reschedule the meeting for a smaller meeting room. As one specific example, if past occupancy for a recurring meeting was less than the capacity of the meeting room, the control circuit 202 can propose a modification (or make a modification) to the recurring meeting to be in a smaller meeting room. Similarly, if a recurring meeting is scheduled for a small meeting room (e.g., a meeting room that is designed to accommodate ten people) but a large number of people (e.g., twenty) typically attend the meeting, the control circuit 202 can propose a modification (or make a modification) to the recurring meeting to be in a larger meeting room. Further, with respect to occupancy, in some embodiments, the control circuit 202 can manage meetings if external factors change the capabilities of the meeting rooms. For example, if restrictions are imposed on, or suggestions implemented for, occupancy (e.g., meetings rooms will be limited to 50% capacity), the control circuit 202 can modify a future meeting by reassigning a larger meeting room to the future meeting.

Figure 3:
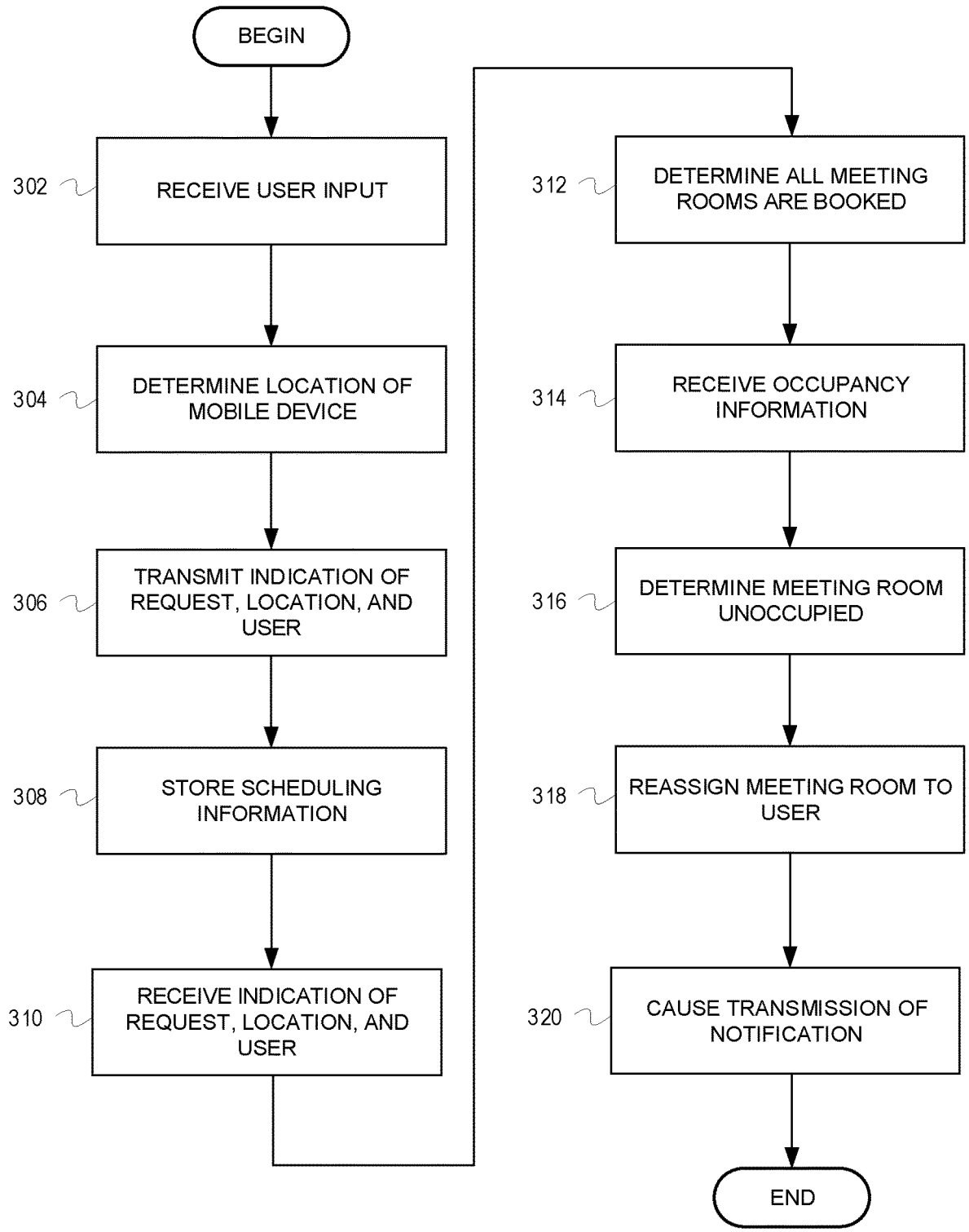
FIG. 3 is a flowchart depicting example operations for reassigning a meeting room, according to some embodiments.

While the discussion of FIG. 2 provides additional detail regarding a system for reassigning meeting rooms, the discussion of FIG. 3 describes example operations of a system for reassigning meeting rooms.

FIG. 3 is a flowchart depicting example operations for reassigning a meeting room, according to some embodiments. The flow begins at block 302.

At block 302, user input is received. For example, a mobile device can receive user input. The user input is input to request a meeting room. The mobile device can receive the user input via an application executing on the mobile device (i.e., a dedicated meeting scheduling application, email application, etc.) and/or via a web-based interface. The flow continues at block 304.

At block 304, a location of the mobile device is determined. For example, the mobile device can determine the location of the mobile device. The mobile device can determine its location based on any suitable locationing mechanism. For example, the mobile device can determine its location based on global positioning system (GPS) capabilities of the mobile device, Wi-Fi locationing, etc. In some embodiments, the user can input a location other than that of the mobile device. For example, if the user is at home, the user can request that the meeting be in a room at work. In such embodiments, this location is used. The flow continues at block 306.

At block 306, an indications of the request, the location, and the user are transmitted. For example, the mobile device can transmit the indications of the request for the meeting room, the location of the mobile device (or desired meeting room), and the identity of the user. The mobile device transmits these indications to a control circuit. The flow continues at block 308.

At block 308, scheduling information is stored. For example, a scheduling database can store the scheduling information. The scheduling information is for the meeting rooms. The scheduling information can include when meetings are scheduled, what meeting rooms are scheduled for meetings, characteristics of the meeting rooms, locations of the meeting rooms, names of the meeting rooms, etc. The flow continues at block 310.

At block 310, indications of the request, the location, and the user are received. For example, the control circuit can receive the indications of the request for the meeting room, the location of the mobile device, and the identity of the user from the mobile device. The control circuit can receive the indication of the request for the meeting room, the location of the mobile device, and the identity of the user via a network. The flow continues at block 312.

At block 312, it is determined that all meeting rooms are booked. For example, the control circuit can determine that all meeting rooms are booked. The control circuit can make this determination based on the locations of the meeting rooms, the capabilities of the meeting rooms, the timing of the request, the characteristics of meeting, etc. For example, the control circuit can determine that all meetings within a threshold distance of the mobile device are booked for a specific time that can accommodate the number of attendees for the meeting. The flow continues at block 314.

At block 314, occupancy information is received. For example, the control circuit can receive occupancy information from sensors associated with the meeting rooms. The occupancy information is indicative of occupancy of the meeting rooms. The sensors can be of any type suitable to detecting occupancy of the meeting rooms. For example, she sensors can include motion sensors, audio sensors, device usage sensors, smart panels, locationing sensors, temperature sensors, thermal sensors, etc. The flow continues at block 316.

At block 316, it is determined that one of the meeting rooms is unoccupied. For example, the control circuit can determine that one of the meeting rooms is unoccupied. The control circuit determines that one of the meeting rooms is unoccupied based on the occupancy information. The flow continues at block 318.

At block 318, the meeting room is reassigned to the user. For example, the control circuit can reassign the meeting room to the user. Even though the meeting room is booked, because the meeting room is unoccupied it is reassigned to the user. The control circuit can reassign the meeting room to the user in the scheduling database. The flow continues at block 320.

At block 320, a notification is transmitted. For example, the control circuit can cause the notification to be transmitted. The notification is transmitted to the user and indicates that the meeting room has been reassigned to the user.

In some embodiments, a system for reassigning meeting rooms comprises a mobile device, wherein the mobile device is carried by a user, wherein the mobile device is configured to receive user input to request a meeting room, determine a location of the mobile device, and transmit, to a control circuit, an indication of the request, the location of the mobile device, and the user, a plurality of sensors, wherein ones of the plurality of sensors are associated with the meeting rooms, wherein the ones of the plurality of sensors are configured to detect occupancy of the meeting rooms with which they are associated, a scheduling database, wherein the scheduling database is configured to store scheduling information for the meeting rooms, and the control circuit, wherein the control circuit is communicatively coupled to the mobile device, the plurality of sensors, and the scheduling database, wherein the control circuit is configured to receive, from the mobile device, the indication of the request, the location of the mobile device, and the user, determine, based on accessing the scheduling database and the indication of the location of the mobile device, that all meeting rooms within a threshold distance from the location of the mobile device are booked, receive, from the plurality of sensors, occupancy information for the meeting rooms, determine, based on the occupancy information for the meeting rooms, that one of the meeting rooms is unoccupied, reassign, in the scheduling database, the one of the meeting rooms to the user, and cause transmission of a notification to the mobile device that the one of the meeting rooms has been reassigned to the user.

In some embodiments, an apparatus and a corresponding method performed by the apparatus comprises receiving, via a mobile device carried by a user, user input to request a meeting room, determining, by the mobile device, a location of the mobile device, transmitting, by the mobile device to a control circuit, an indication of the request, the location of the mobile device, and the user, storing, by a scheduling database, scheduling information for the meeting rooms, receiving, by the control circuit, the indication of the request, the location of the mobile device, and the user, determining, by the control circuit based on accessing the scheduling database and the indication of the location of the mobile device, that all meeting rooms within a threshold distance from the location of the mobile device are booked, receiving, by the control circuit from a plurality of occupancy sensors associated with the meeting rooms, occupancy information for the meeting rooms, determining, by the control circuit based on the occupancy information for the meeting rooms, that one of the meeting rooms is unoccupied, reassigning, by the control circuit in the scheduling database, the one of the meeting rooms to the user, and causing transmission, by the control circuit, of a notification to the mobile device that the one of the meeting rooms has been reassigned to the user.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:
1. A system for reassigning meeting rooms, the system comprising:
a plurality of sensors, wherein ones of the plurality of sensors are associated with the meeting rooms, wherein the ones of the plurality of sensors are configured to detect occupancy of the meeting rooms with which they are associated;
a scheduling database, wherein the scheduling database is configured to store scheduling information for the meeting rooms; and
a control circuit, wherein the control circuit is communicatively coupled to the plurality of sensors and the scheduling database via a network, wherein the control circuit is configured to:
receive, via the network, from a mobile device associated with a user, an indication of a request for a meeting room and the location of the mobile device;
determine, based on accessing the scheduling database and the indication of the location of the mobile device, that all meeting rooms within a threshold distance from the location of the mobile device are booked;
receive, from the plurality of sensors via the network, occupancy information for the meeting rooms;

determine, based on the occupancy information for the meeting rooms, that one of the meeting rooms within the threshold distance that is booked is unoccupied;

reassign to the user, in the scheduling database, the one of the meeting rooms within the threshold distance that is booked and unoccupied; and cause transmission of a notification to the mobile device, via the network, that the one of the meeting rooms within the threshold distance that is booked and unoccupied has been reassigned to the user.

2. The system of claim 1, wherein the sensors include one or more of motion sensors, audio sensors, device usage sensors, smart panels, locationing sensors, temperature sensors, and thermal sensors.

3. The system of claim 1, wherein the control circuit is further configured to:

determine, based on accessing the scheduling database, a meeting originator, wherein the meeting originator had scheduled a meeting in the one of the meeting rooms within the threshold distance that is booked and unoccupied; and cause transmission of a second notification to the meeting originator, via the network, indicating that the one of the meeting rooms within the threshold distance that is booked and unoccupied has been reassigned.

4. The system of claim 1, wherein the control circuit is further configured to:

receive, from the mobile device, via the network, a list of criteria; and determine, from the meeting rooms, that the one of the meeting rooms within the threshold distance that is booked and unoccupied matches the list of criteria.

5. The system of claim 4, wherein the list of criteria includes one or more of size, capacity, hardware included, conferencing capabilities, divisibility, and location.

6. The system of claim 1, wherein the control circuit is further configured to:

determine, based on accessing the scheduling database, that a meeting previously scheduled for the one of the meeting rooms within the threshold distance that is booked and unoccupied is a recurring meeting; and determine, based on accessing the scheduling database, that the recurring meeting has been missed a threshold number of times.

7. The system of claim 6, wherein the control circuit is further configured to:

cancel, in the scheduling database based on the recurring meeting being missed the threshold number of times, future occurrences of the recurring meeting.

8. The system of claim 6, wherein the control circuit is further configured to:

cause transmission of a second notification, via the network, to an originator of the recurring meeting, wherein the notification warns the originator of the recurring meeting that future occurrences of the recurring meeting will be canceled if a condition is met.

9. The system of claim 6, wherein the control circuit is further configured to:

determine, based on accessing the scheduling database, past occupancy for the recurring meeting;

determine, based on the past occupancy for the recurring meeting, a modification to the recurring meeting, wherein the modification includes selection of a new meeting room based on the past occupancy for the recurring meeting and a capacity of the new meeting room; and cause transmission, via the network, of an indication of the modification to the recurring meeting to an originator of the recurring meeting.

10. The system of claim 1, wherein the mobile device is executing a scheduling application, wherein the scheduling application is configured to receive a user input to request a meeting room.

11. A method for reassigning meeting rooms, the method comprising:

receiving, by a control circuit via a network from a mobile device associated with a user, an indication of a request for a meeting room and the location of the mobile device;

determining, by the control circuit based on accessing the scheduling database and the indication of the location of the mobile device, that all meeting rooms within a threshold distance from the location of the mobile device are booked;

receiving, by the control circuit via the network from a plurality of occupancy sensors associated with the meeting rooms, occupancy information for the meeting rooms;

determining, by the control circuit based on the occupancy information for the meeting rooms, that one of the meeting rooms within the threshold distance that is booked is unoccupied;

reassigning to the user, by the control circuit in the scheduling database, the one of the meeting rooms within the threshold distance that is booked and unoccupied; and causing transmission, by the control circuit via the network, of a notification to the mobile device that the one of the meeting rooms within the threshold distance that is booked and unoccupied has been reassigned to the user.

12. The method of claim 11, wherein the sensors include one or more of motion sensors, audio sensors, device usage sensors, smart panels, locationing sensors, temperature sensors, and thermal sensors.

13. The method of claim 11, further comprising:

determining, by the control circuit based on accessing the scheduling database, a meeting originator, wherein the meeting originator had scheduled a meeting in the one of the meeting rooms within the threshold distance that is booked and unoccupied; and causing transmission, by the control circuit via the network to the meeting originator, a second notification indicating that the one of the meeting rooms within the threshold distance that is booked and unoccupied has been reassigned.

14. The method of claim 11, further comprising:

receiving, by the control circuit from the mobile device via the network, a list of criteria; and determining, by the control circuit from the meeting rooms, that the one of the meeting rooms within the threshold distance that is booked and unoccupied matches the list of criteria.

15. The method of claim 14, wherein the list of criteria includes one or more of size, capacity, hardware included, conferencing capabilities, divisibility, and location.

16. The method of claim 11, further comprising:

determining, by the control circuit based on accessing the scheduling database, that a meeting previously scheduled for the one of the meeting rooms within the threshold distance that is booked and unoccupied is a recurring meeting; and determining, by the control circuit based on accessing the scheduling database, that the recurring meeting has been missed a threshold number of times.

17. The method of claim 16, further comprising:

canceling, by the control circuit in the scheduling database based on the recurring meeting being missed the threshold number of times, future occurrences of the recurring meeting.

18. The method of claim 16, further comprising:

causing transmission, by the control circuit via the network, of a second notification to an originator of the recurring meeting, wherein the notification warns the originator of the recurring meeting that future occurrences of the recurring meeting will be canceled if a condition is met.

19. The method of claim 16, further comprising:

determining, by the control circuit based on accessing the scheduling database, past occupancy for the recurring meeting;

determining, by the control circuit based on the past occupancy for the recurring meeting, a modification to the recurring meeting, wherein the modification includes selection of a new meeting room based on the past occupancy for the recurring meeting and a capacity of the new meeting room; and causing transmission, by the control circuit via the network, of an indication of the modification to the recurring meeting to an originator of the recurring meeting.

20. The method of claim 11, wherein the mobile device is executing a scheduling application, wherein the scheduling application is configured to receive a user input to request a meeting room.

\* \* \* \* \*